(12) United States Patent
Kawarai et al.

(10) Patent No.: US 7,855,479 B2
(45) Date of Patent: Dec. 21, 2010

(54) NOISE SUPPRESSION STRUCTURE OF BLOWER MOTOR

(75) Inventors: Hiromi Kawarai, Tokyo (JP); Shigenori Ohira, Tokyo (JP); Eiji Sato, Fukushima (JP)

(73) Assignees: Calsonic Kansei Corporation, Tokyo (JP); Kitashiba Electric Co., Ltd., Fukushima-shi (JP)

( * ) Notice: Subject to any disclaimer, the term of this patent is extended or adjusted under 35 U.S.C. 154(b) by 501 days.

(21) Appl. No.: 11/656,964

(22) Filed: Jan. 24, 2007

(65) Prior Publication Data

US 2007/0170789 A1    Jul. 26, 2007

(30) Foreign Application Priority Data

Jan. 25, 2006    (JP) .............................. 2006-015787

(51) Int. Cl.
*H02K 5/24* (2006.01)
*H02K 11/00* (2006.01)

(52) U.S. Cl. .............................. 310/51; 310/71; 310/239

(58) Field of Classification Search ............... 310/67 R, 310/68 R, 71, 248, 249, 239, 51; H02K 5/24, H02K 13/00
See application file for complete search history.

(56) References Cited

U.S. PATENT DOCUMENTS

| | | | |
|---|---|---|---|
| 4,748,356 A | 5/1988 | Okashiro et al. | |
| 5,173,628 A * | 12/1992 | Yoshida et al. | 310/71 |
| 5,598,045 A | 1/1997 | Ohtake et al. | |
| 5,949,173 A * | 9/1999 | Wille et al. | 310/220 |
| 6,078,117 A * | 6/2000 | Perrin et al. | 310/68 R |
| 6,870,298 B2 * | 3/2005 | Takashima et al. | 310/239 |
| 6,933,637 B2 * | 8/2005 | Hama et al. | 310/71 |
| 6,975,059 B2 * | 12/2005 | Sakai et al. | 310/239 |

FOREIGN PATENT DOCUMENTS

| | | |
|---|---|---|
| JP | 61-004433 A | 1/1986 |
| JP | 62-124292 U | 8/1987 |
| WO | WO 2005/107045 A1 | 11/2005 |

* cited by examiner

*Primary Examiner*—Quyen Leung
*Assistant Examiner*—Eric Johnson
(74) *Attorney, Agent, or Firm*—Foley & Lardner LLP

(57) ABSTRACT

In a noise suppression structure of a blower motor according to the present invention, a noise reduction member is disposed inside of a peripheral wall part of an end bracket member in such a manner that the noise reduction member is located in a position opposite side of the peripheral wall part to which a connector part is provided, a metal terminal member extended from the connector part has an extension part extendedly provided along a bottom surface part of the end bracket member in a circumferential direction thereof, and the extension part of the metal terminal member has a connection part to which the noise reduction member is connected.

18 Claims, 14 Drawing Sheets

NOISE SUPPRESSION STRUCTURE OF BLOWER MOTOR

BACKGROUND

The present invention relates to a noise suppression structure of a blower motor provided with noise suppression parts therein. More particularly, the invention relates to a noise suppression structure of a blower motor used in an air conditioner mounted in a vehicle.

There has been known a noise suppression structure of a motor, such as a structure disclosed in Japanese utility model publication No. S62-124292 for example.

Referring to FIGS. 19 and 20, Japanese utility model publication No. S62-124292 discloses the noise suppression structure of a fuel pump, in which a bracket member 2 made of a resin is provided on a front end opening 1a of a cylindrical motor housing 1, and an end bracket member 3 also made of a resin is provided on a rear end opening 1b of the motor housing 1. Both ends of a motor rotary shaft member 4 are supported rotatably thereby.

The motor rotary shaft member 4 is provided with a commutator 5, and a pair of brush members 6 is disposed to oppose the commutator 5.

Pigtails 7 including metal strands and derived from the brush members 6 are connected through choke coils 8 as noise reduction members with lead wires 9 derived from the front end opening 1a, respectively.

In the structure of Japanese utility model publication No. S62-124292, when the lead wires 9 are energized, the motor rotary shaft member 4 is rotated to drive and rotate the fuel pump.

At this time, noise is reduced by the choke coils 8, and thereby, influence on peripheral electronic devices is suppressed.

However, in the conventional noise suppression structure of the motor including the structure disclosed in Japanese utility model publication No. S62-124292, the lead wires 9 derived from the front end opening 1a are connected with wires for externally supplying current and so on.

Hence, when the end bracket member 3 is directly provided with a connector part for connecting the wires which externally supplies the current and so on, the connector part and the choke coils 8 are unevenly disposed at one side of the end bracket member 3. Therefore, there is a drawback in terms of efficiency in utilization of space.

Also, when winding of each of the choke coils 8 is directly welded to a metal terminal of the connector part by resistance welding, there is a possibility that a welded part in the metal terminal of the connector part is detached due to internal stress of the winding of the choke coils 8 wired for a long distance and bent for several times. Thus, there is a problem that a position of installation is restricted unless a flexible lead wire is used to increase the number of component parts.

SUMMARY

At least one objective of the present invention is to provide a noise suppression structure of a blower motor capable of providing noise reduction members with fine space efficiency, and in which workability in assembling is good.

To achieve these and other advantages and in accordance with the purpose of the invention, as embodied and broadly described herein, the invention provides a noise suppression structure of a blower motor, which comprises: a bottomed, substantially cylindrical-shaped end bracket member including a peripheral wall part (16) and a bottom surface part (17), the peripheral wall part (16) being provided between the bottom surface part (17) and a housing (11) and an end edge (16b) of the peripheral wall part (16) being configured to be mounted to an one end opening (11a) of the housing (11), and the bottom surface part (17) being integrally formed with the peripheral wall part (16), rotatably supporting one end of a motor rotary shaft part (4') and covering the one end opening (11a) of the housing (11); a connector part (18) disposed in the end bracket member (15), provided in the peripheral wall part (16), and to which electric power is externally supplied; a metal terminal member (19) provided in the end bracket member (15), coupled to the connector part (18), and including an extension part (19c) being extendedly provided along the bottom surface part (17) in a circumferential direction (S) of the bottom surface part (17) and having a connection part (19d); a brush member (6') provided in the end bracket member (15) and opposing a commutator (5') mounted to the motor rotary shaft part (4'); and a noise reduction member (8') disposed in the end bracket member (15) in a position opposite side of the peripheral wall part (16) to which the connector part (18) is provided, and inserted between the metal terminal member (19) and the brush member (6') to be connected with the connection part (19d) of the extension part (19c) of the metal terminal member (19) and the brush member (6').

Advantageously, the noise reduction member (8') includes a choke coil (8'), and the noise suppression structure of the blower motor further comprises a guide member (25) protruded from the bottom surface part (17) toward an inside part of the blower motor, having a constant height, and configured to guide a conductor of the choke coil (8') along the bottom surface part (17) in the circumferential direction (S) of the bottom surface part (17), and the guide member (25) includes a metal terminal guide surface part (25a) on an upper surface thereof configured to slide and guide the metal terminal member (19) when the metal terminal member (19) is mounted to the connector part (18) from the inside part of the blower motor.

Advantageously, the guide member (25) includes a stopper part (25b) on a side surface of the guide member (25) facing the connector part (18), which contacts with a rear end part (19h) of the metal terminal member (19) to prevent the metal terminal member (19) from coming off the connector part (18).

Advantageously, the connector part (18) includes an insertion hole (18c) to which a part of the metal terminal member (19) is inserted, and a size of the insertion hole (18c) is set in a size in which insertion of the metal terminal member (19) in an oblique direction is tolerated.

Advantageously, the bottom surface part (17) includes a reinforcement rib part (17c), and an upper surface of the reinforcement rib part (17c) is provided with a supporting surface part (17d) which contacts with the metal terminal member (19) from below to support the metal terminal member (19).

Advantageously, the guide member (25) includes an inclined guide surface part (25c) between the metal terminal guide surface part (25a) and a side surface of the guide member (25) facing the connector part (18), and the inclined guide surface part (25c) is slanted to have a constant dimension of drop.

Advantageously, the extension part (19c) of the metal terminal member (19) includes a caulking part (19f) adapted to be fixed to the bottom surface part (17) of the end bracket member (15).

Advantageously, the bottom surface part (17) of the end bracket member (15) includes a slide groove part (17a) which penetrates the bottom surface part (17) and to which the caulking part (19*f*) is inserted to be caulked and fixed.

Advantageously, the connector part (18) includes a caulking hole (18*d*) to which a part of the metal terminal member (19) is inserted and caulked.

Advantageously, the bottom surface part (17) includes a welding hole (17*b*) to which an electrode is inserted to connect the noise reduction member (8') with the connection part (19*d*) of the extension part (19*c*) of the metal terminal member (19) by resistance welding.

Advantageously, the end bracket member (15) includes a supporting pin member (23) protruded from the bottom surface part (17) toward an inside part of the blower motor for supporting a brush holder member (24), and the brush member (6') is slidably held in the brush holder member (24).

Advantageously, the conductor of the choke coil (8') includes a bending point (21*b*) in which the conductor is bent to extend substantially linearly toward the connection part (19*d*) of the of the extension part (19*c*) of the metal terminal member (19).

Advantageously, a rear end part (19*h*) of the metal terminal member (19) is chamfered such that the metal terminal member (19) smoothly slides and contacts with the metal terminal guide surface part (25*a*) of the guide member (25).

Advantageously, the metal terminal member (19) includes a pair of guide protrusions (19*g*), and the bottom surface part (17) includes guide protrusions (17*e*) protrudedly provided toward inside of the blower motor from the bottom surface part (17), and an end part of the conductor of the choke coil (8') on a side of the connecter part (18) extends to be located between the pair of guide protrusions (19*g*) of the metal terminal member 19 and protruded therefrom, and the protruded end part of the conductor is mounted between the guide protrusions (17*e*).

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
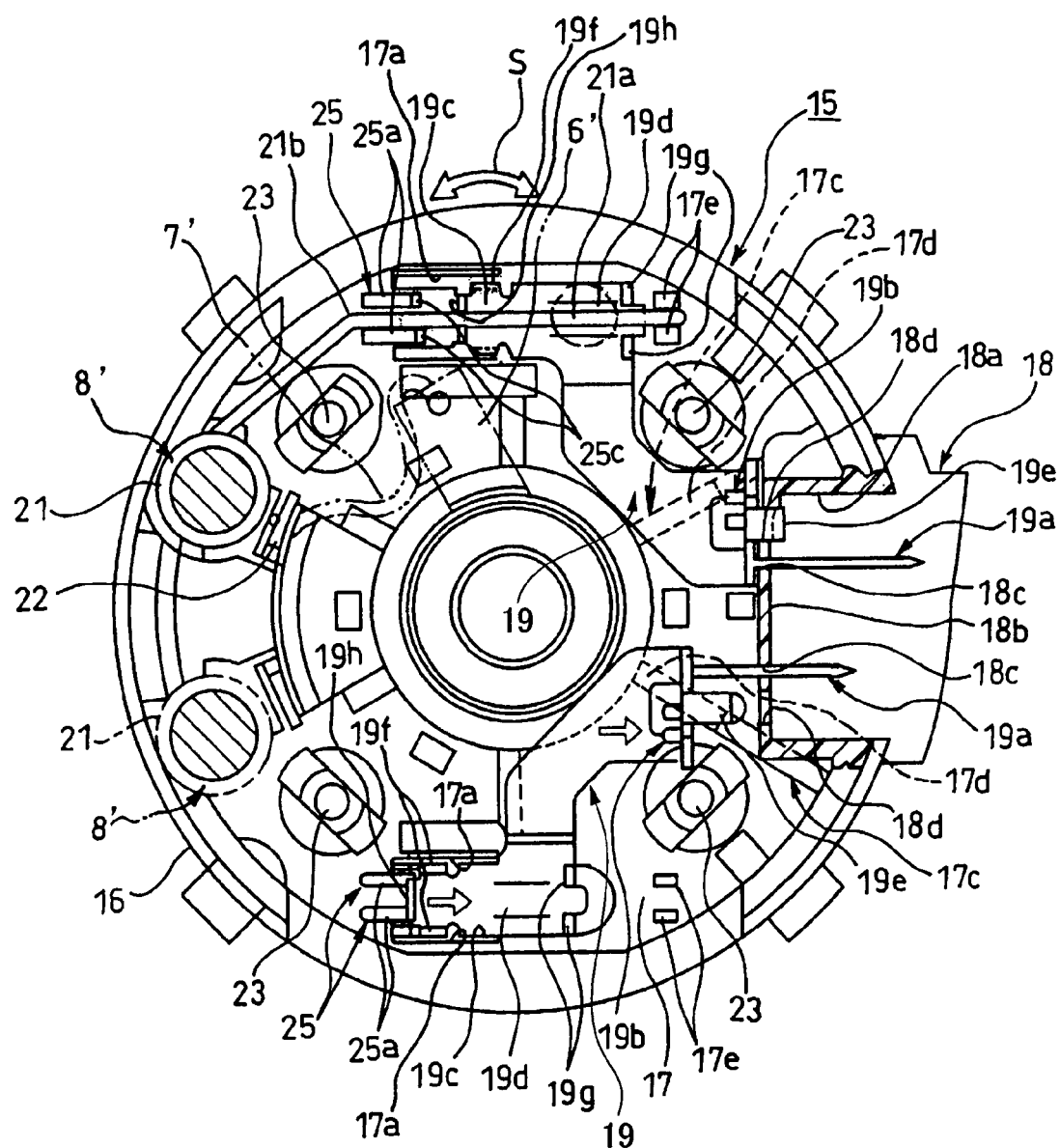
FIG. 1 is a partially cross-sectional top view illustrating a structure of an end bracket member of a noise suppression structure of a blower motor according to an embodiment of the invention, in which one of metal terminal members located on an upper side of the drawing is in a fixed state and the other of the metal terminal members located on a lower side of the drawings is in a state of middle of slide-insertion.

Reference will now be made in detail to the present preferred embodiments of the invention, examples of which are illustrated in the accompanying drawings. Wherever possible, the same reference numbers are used in the drawings and the description to refer to the same or like parts. The scope of the present invention, however, is not limited to these embodiments. Within the scope of the present invention, any structure and material described below can be appropriately modified.

FIGS. 1 to 18 illustrate a noise suppression structure of a blower motor according to an embodiment of the invention.

Figure 18:
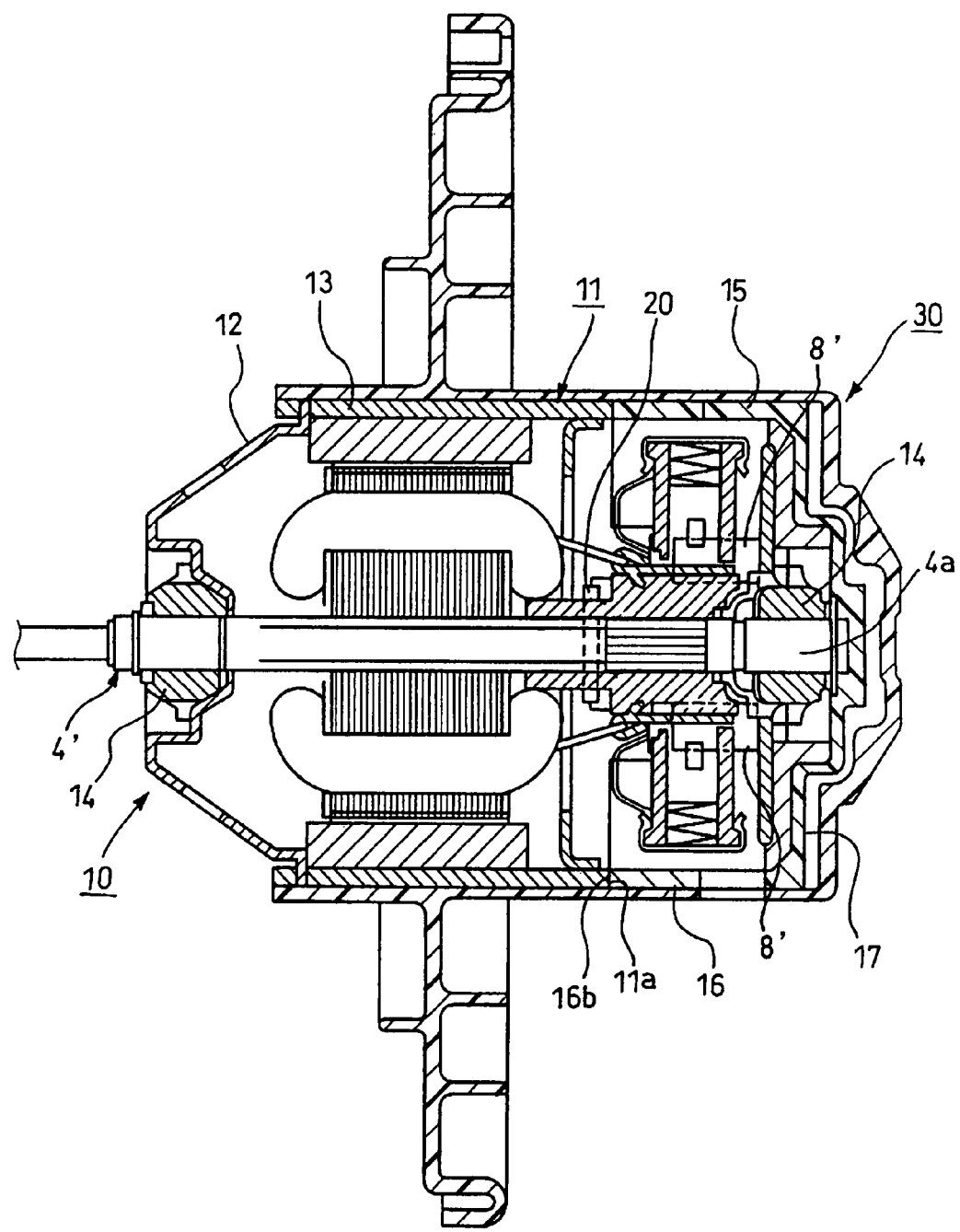
FIG. 18 is a cross-sectional view taken along an axial direction, illustrating a structure in which the blower motor embedded with noise reduction members is attached to a bracket member which is made of a resin and suitable for being mounted in a vehicle, in accordance with the noise suppression structure of the blower motor according to an embodiment of the invention.
Figure 19:
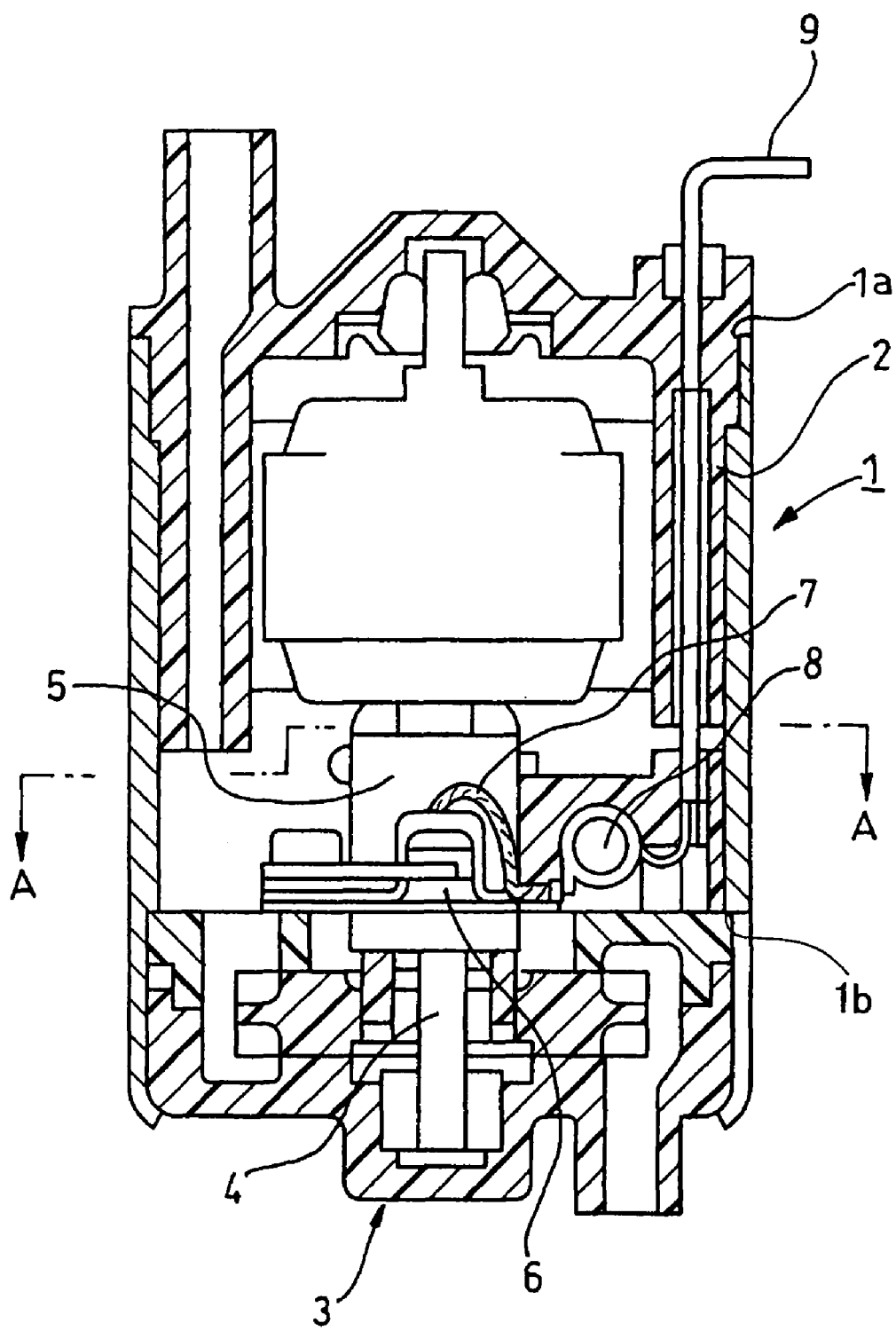
FIG. 19 is a cross-sectional view taken along an axial direction according to a conventional noise suppression structure of a fuel pump.
Figure 20:
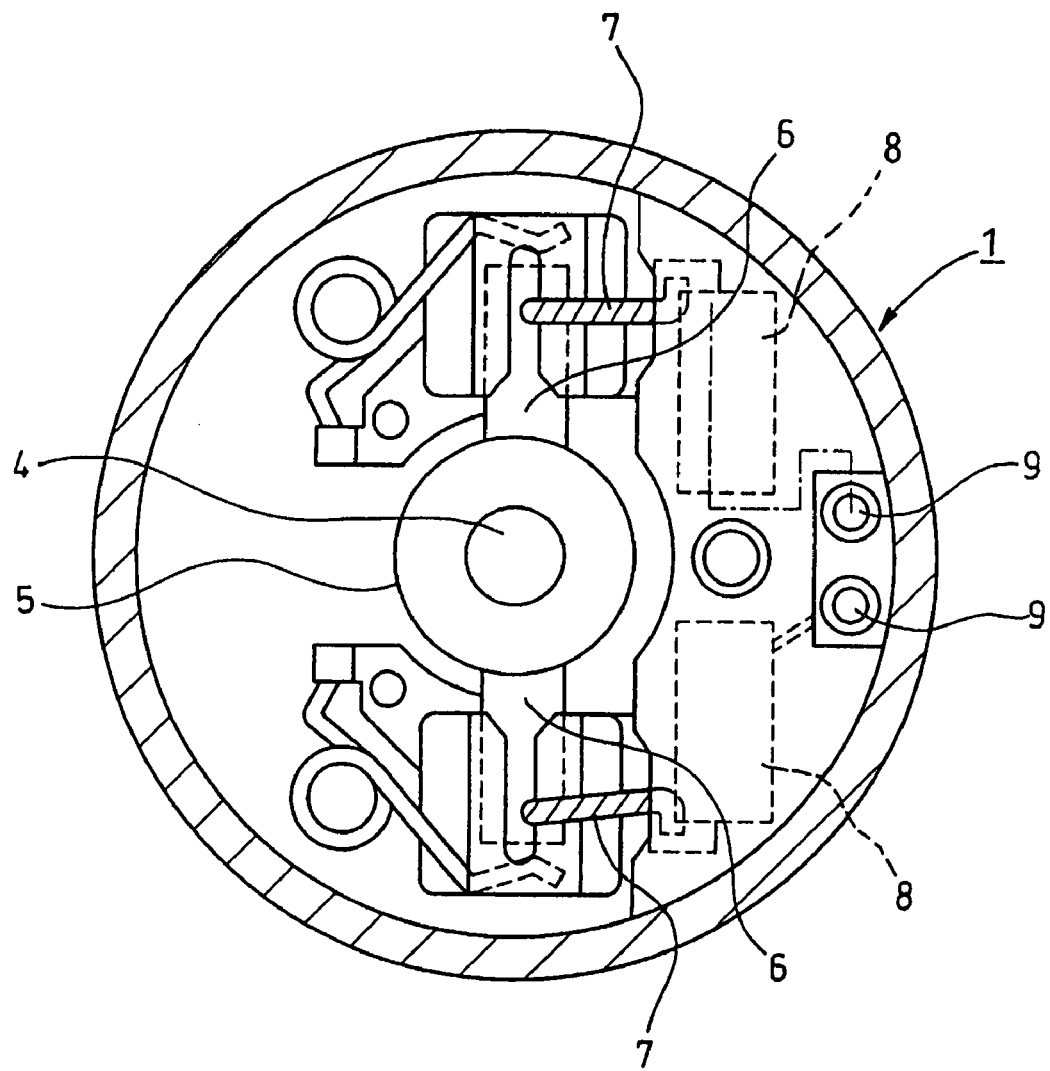
FIG. 20 is a cross-sectional view taken along a position of a line A-A of FIG. 19 according to the conventional noise suppression structure of the fuel pump.

Referring to FIG. 18, in a noise suppression structure of a blower blower motor used in a vehicle-mounted air conditioner according to the present preferred embodiment, a housing 11 structuring a main body of a motor and preferably made of a metal includes a cylindrical body part 13, and an end part 12 substantially conical in shape and formed integrally with the body part 13. One end of a motor rotary shaft member 4' is rotatably supported by the end part 12 through a bearing member 14.

The housing 11 is provided with an end bracket member 15 preferably made of a resin on an one end opening 11a located on a rear end side thereof.

The end bracket member 15 is mainly structured such that an end edge 16b of a peripheral wall part 16 substantially in a cylindrical shape is fitted to the one end opening 11a formed on a rear end of the body part 13 of the housing 11.

Also, the end bracket member 15 includes a bottom surface part 17 substantially in a circular shape as seen from a lower surface thereof and formed integrally with the peripheral wall part 16 in such a manner as to cover the one end opening 11a. Thus, the end bracket member 15 is structured to have a bottomed, substantially cylindrical configuration.

In addition, an one end 4a of the motor rotary shaft member 4' is rotatably supported by a central part of the bottom surface part 17 through the bearing member 14.

Referring to FIG. 1, inside of the end bracket member 15 is provided with a connector part 18 to which electric power is externally supplied.

The connector part 18 includes a female connector concave part 18a to which a not-illustrated male connector member is fitted and formed in a concave shape.

The female connector concave part 18a includes a partition wall surface part 18b. The partition wall surface part 18b is formed with a pair of insertion holes 18c to which contacts 19a of metal terminal members 19 are respectively inserted from inside to outside of the end bracket member 15. In the present preferred embodiment, the insertion holes 18c are formed to have a two-straight-line shape.

In addition, the partition wall surface part 18b of the female connector concave part 18a is formed with pairs of upper and lower caulking holes 11d on left and right sides of the pair of insertion holes 18c, to which front surface caulking parts 19e of the metal terminal members 19 are respectively inserted and caulked.

Figure 2:
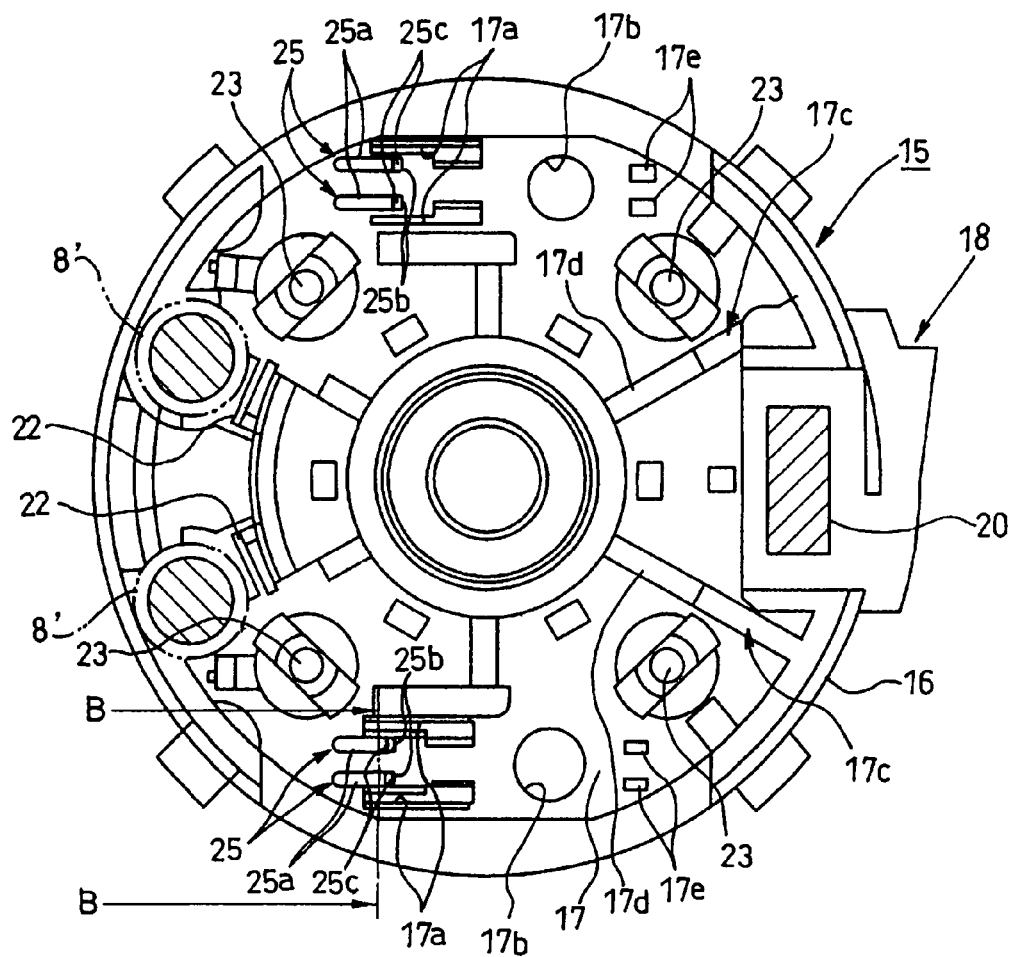
FIG. 2 is a top view illustrating the structure of the end bracket member of the noise suppression structure of the blower motor according to an embodiment of the invention.
Figure 3:
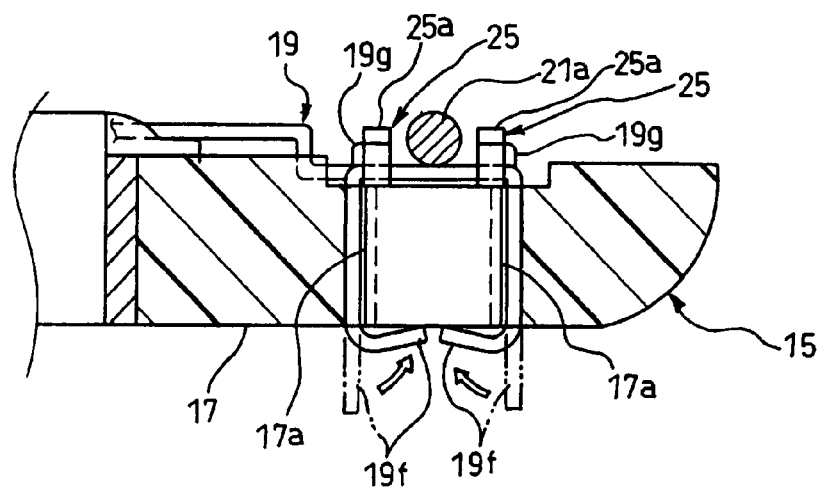
FIG. 3 is an end view of a part corresponding to a position taken along a line B-B of FIG. 2, illustrating a structure of a lower surface caulking part of the noise suppression structure of the blower motor according to an embodiment of the invention.
Figure 4:
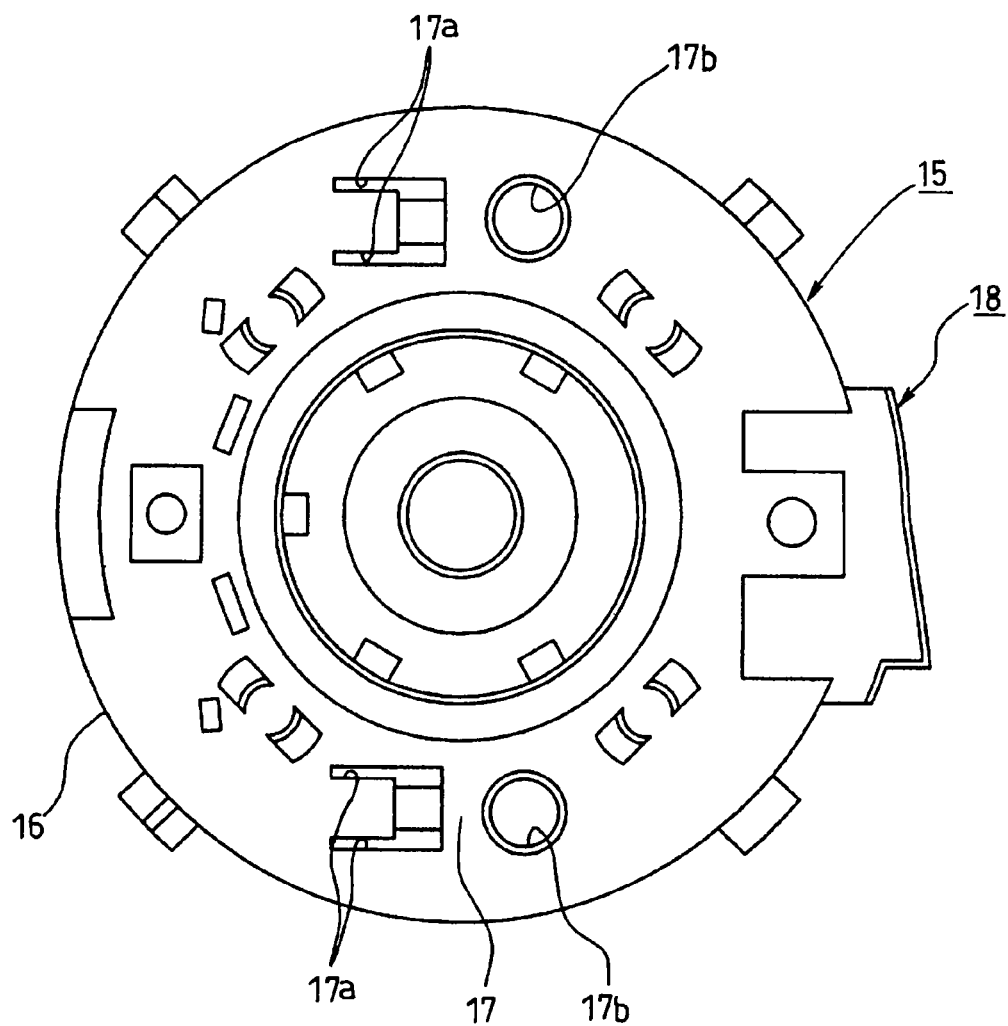
FIG. 4 is a bottom view illustrating the structure of the end bracket member of the noise suppression structure of the blower motor according to an embodiment of the invention.
Figure 5:
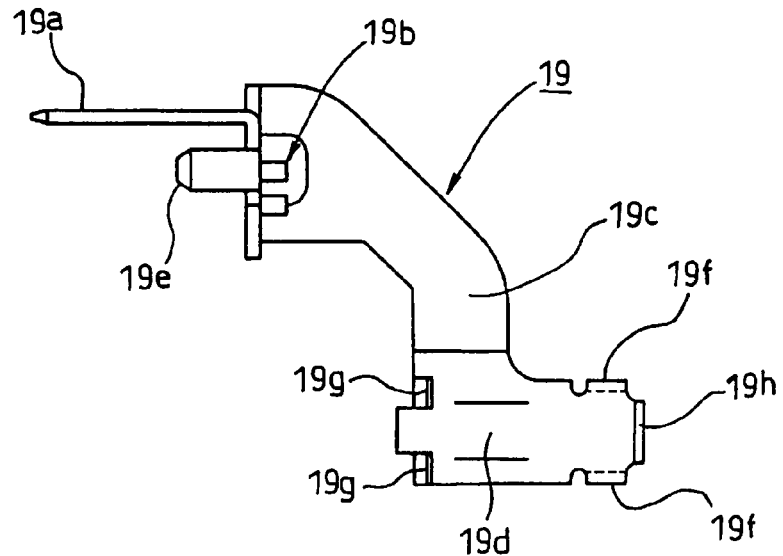
FIG. 5 is a top view illustrating one of the metal terminal members used in the noise suppression structure of the blower motor according to an embodiment of the invention.
Figure 13:
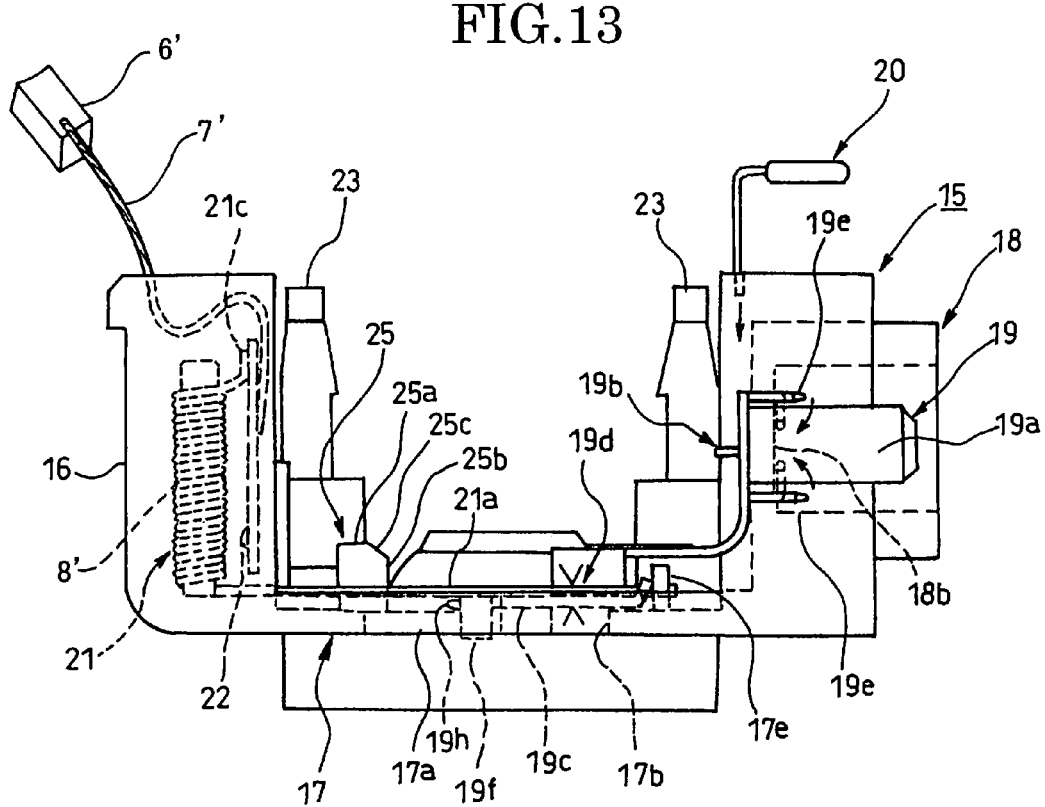
FIG. 13 is an exploded side view illustrating a fixing process of the metal terminal member in the assembling process of the noise suppression structure of the blower motor according to an embodiment of the invention.

Also, a noise-killer capacitor member 20 illustrated in FIGS. 2 and 13 as one of noise reduction members is connected and caulked by rear side caulking parts 19b in such a manner that the noise-killer capacitor member 20 connects the metal terminal members 19.

The metal terminal members 19 are respectively provided to be connected electrically with brush members 6' each opposing a commutator 5' mounted to the motor rotary shaft member 4'. Between the metal terminal members 19 and the brush members 6', there are interposed choke coil members 8' as one of the noise reduction members, conversion plates 22 and pigtails 7', respectively.

The bottom surface part 17 of the end bracket member 15 is provided with supporting pin members 23 protruded upwardly from the bottom surface part 17. In the preferred embodiment, the bottom surface part 17 is integrally formed with a total of four supporting pin members 23.

Figure 14:
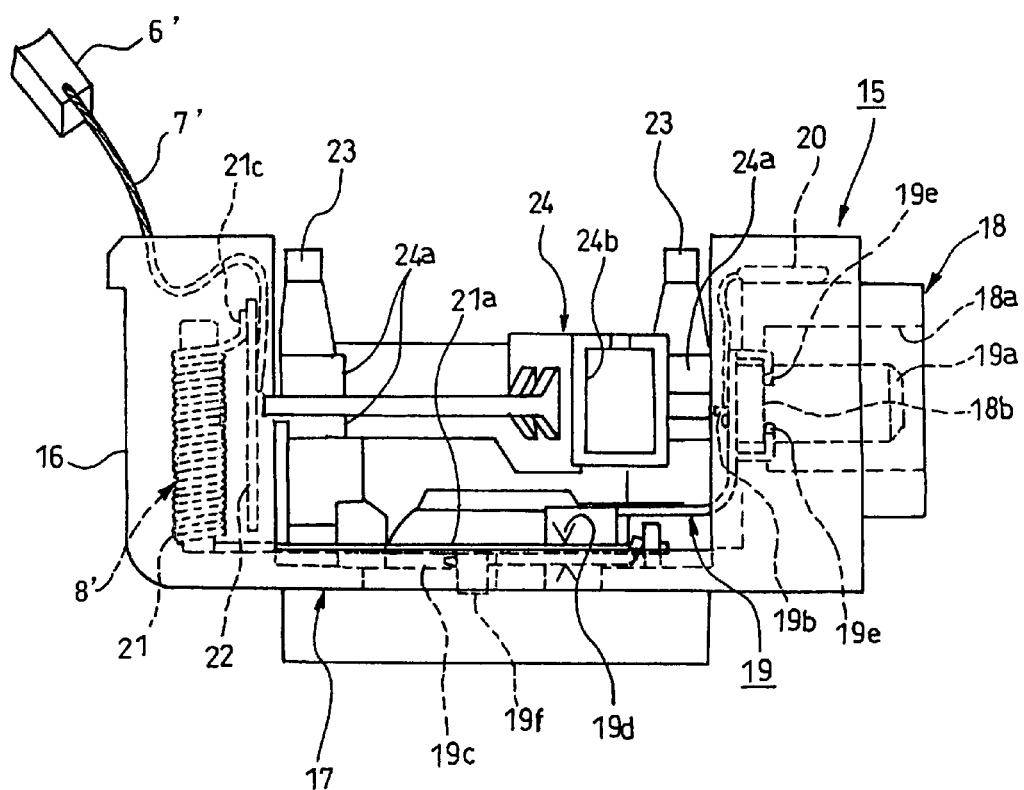
FIG. 14 is an exploded side view illustrating a process of mounting of a brush holder member in the assembling process of the noise suppression structure of the blower motor according to an embodiment of the invention.

Referring to FIG. 14, the supporting pin members 23 support a brush holder member 24 through rubber bushes 24a, respectively.

The brush members 6' are held in a holder part 24b of the brush holder member 24 in such a manner that the brush members 6' are freely slideable by bias of not-illustrated biasing members such as spring members or the like toward inside substantially in a radial direction of the brush holder member 24.

In the noise suppression structure of the blower motor according to the present preferred embodiment of the invention, the peripheral wall part 16 provided between the bottom surface part 17 and the housing 11 in the end bracket member 15 is provided with the connector part 18.

In addition, according to the present preferred embodiment, the choke coils 8' as one of the noise reduction members are provided inside of the peripheral wall part 16 of the end bracket member 15, and the choke coils 8' are located on a cooling air intake side which is an opposite side of the part to which the connector part 18 is provided in the peripheral wall part 16 of the end bracket member 15.

Each of the metal terminal members 19 extendedly provided from the connector part 18 includes an extension part 19c. The extension part 19c of the metal terminal member 19 is flexed substantially in an S-like configuration as seen from above, and is extendedly provided along the bottom surface part 17 in a circumferential direction S.

The extension part 19c of the metal terminal member 19 includes a connection part 19d to which a derivation coil winding 21a as a conductor extendedly provided from a winding 21 of the choke coil 8' is connected by resistance welding for example.

In the present preferred embodiment, the derivation coil winding 21a of the winding 21 or a coil body 21 is extendedly provided substantially linearly along the circumferential direction S directly, flexed once in a bending point 21b, and then extendedly provided substantially linearly toward the connection part 19d. In the connection part 19d of the metal terminal member 19, the derivation coil winding 21a is interposed and fixed between a metal sheet or a metal plate, preferably a copper sheet or a copper plate formed by cut and raise of the connection part 19d, and the connection part 19d. The derivation coil winding 21a interposed between the metal sheet or the metal plate and the connection part 19d is preferably welded by resistance welding in which electrodes are caused to contact therewith from upper and lower directions.

An other end 21c of the winding 21 of the choke coil 8' is connected with the conversion plate 22, and thus, the other end 21c of the winding 21 of the choke coil 8 is electrically connected with the brush member 6' through the pigtail 7' connected with the conversion plate 22.

The derivation coil winding 21a of the choke coil 8' is guided along the circumferential direction S by guide members 25 protrudedly provided near the bending point 21b toward inside of the motor from the bottom surface part 17 of the end bracket member 15 and having a constant height.

Furthermore, an end part of the derivation coil winding 21a of the choke coil 8' on a side of the connecter part 18 is located between a pair of guide protrusions 19g of the metal terminal member 19 and protruded therefrom, and is mounted between guide protrusions 17e protrudedly provided toward inside of the motor from the bottom surface part 17 and which has a constant height.

An interspace through which the derivation coil winding 21a is inserted is provided between the guide members 25.

On an upper surface of each of the guide members 25, there is provided a metal terminal guide surface part 25a for slidingly guiding the metal terminal member 19 when the metal terminal member 19 is to be inserted into the insertion hole 18c formed on the connector part 18 from inside of the motor and mounted thereto.

Also, on a side surface of each of the guide members 25 on the side of the connecter part 18, there is formed a stopper part 25b for contacting a rear end part 19h of the metal terminal member 19.

The stopper part 25b on the connector part side of the guide member 25 contacts with the rear end part 19h of the metal terminal member 19 in a state in which the contact 19a of the metal terminal member 19 is inserted into the insertion hole 18c formed on the connector part 18 from inside of the motor, such that the contact 19a is prevented from coming off the insertion hole 19c of the connector part 18.

Figure 11:
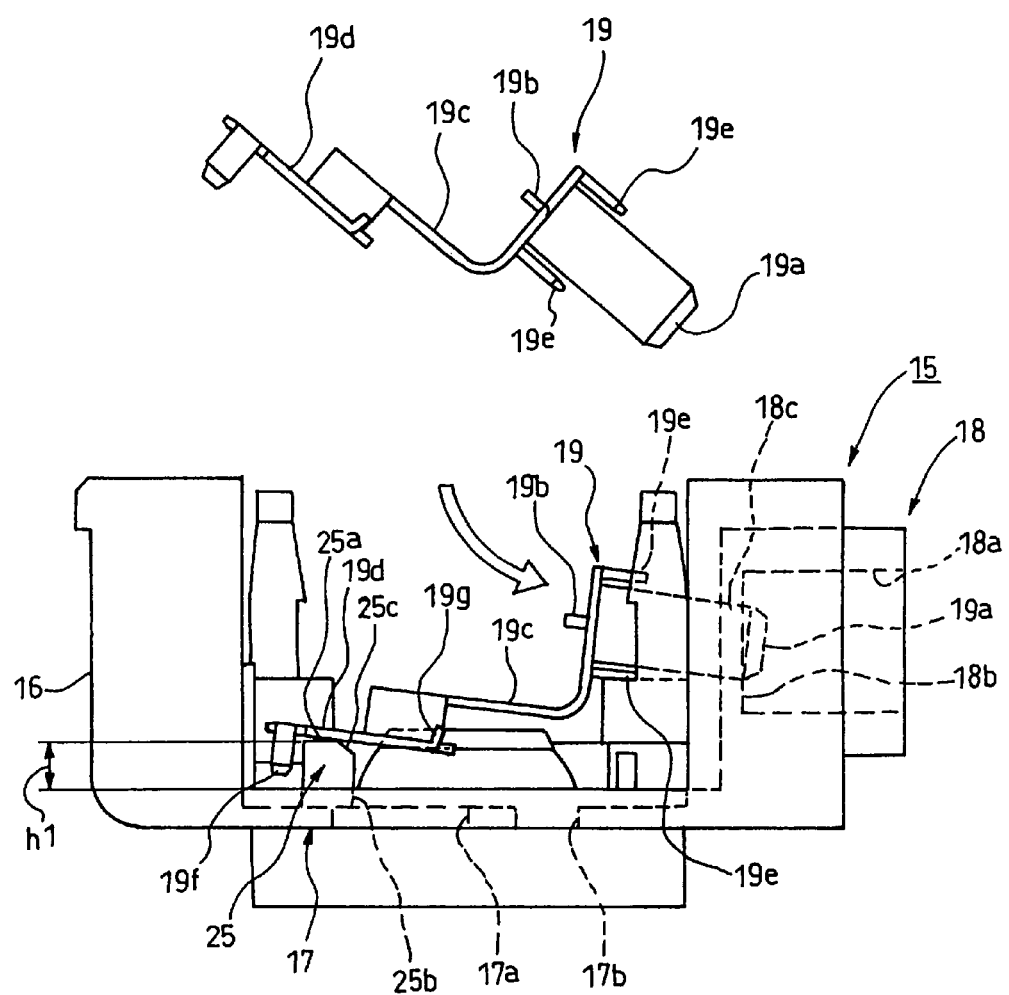
FIG. 11 is an exploded side view illustrating an assembling process of the noise suppression structure of the blower motor according to an embodiment of the invention.

As illustrated in FIG. 11, an inclined guide surface part 25c including a partially cut slanted surface and having a constant dimension h1 of drop or gap is provided between the metal terminal guide surface part 25a and the side surface on the connecter part side provided with the stopper part 25b of the guide member 25.

Figure 6:
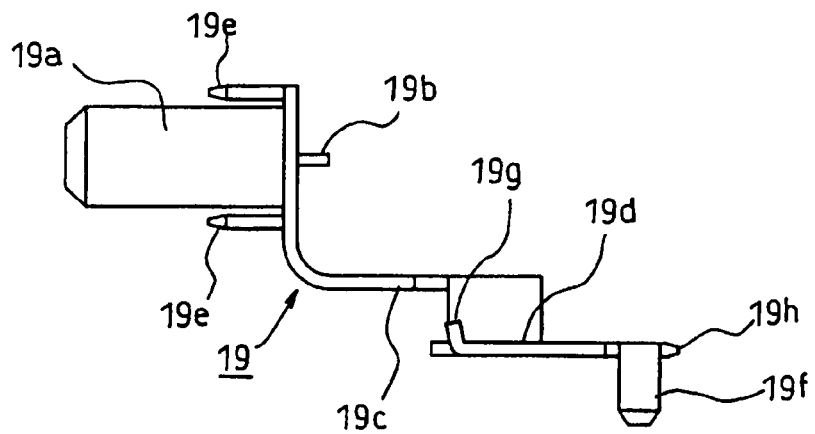
FIG. 6 is a side view illustrating one of the metal terminal members used in the noise suppression structure of the blower motor according to an embodiment of the invention.
Figure 7:
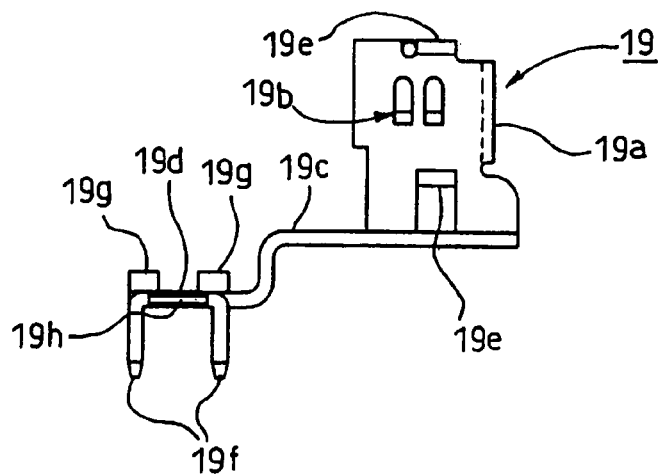
FIG. 7 is a rear view illustrating one of the metal terminal members used in the noise suppression structure of the blower motor according to an embodiment of the invention.
Figure 8:
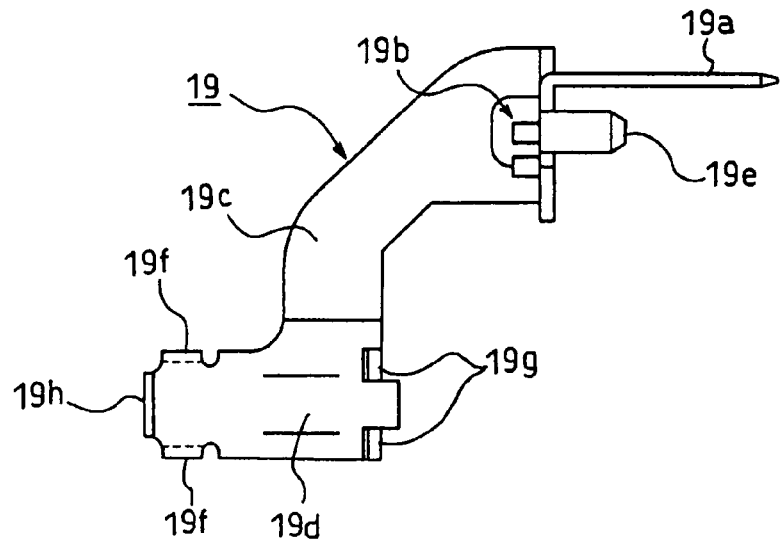
FIG. 8 is a top view illustrating the other of the metal terminal members used in the noise suppression structure of the blower motor according to an embodiment of the invention.
Figure 9:
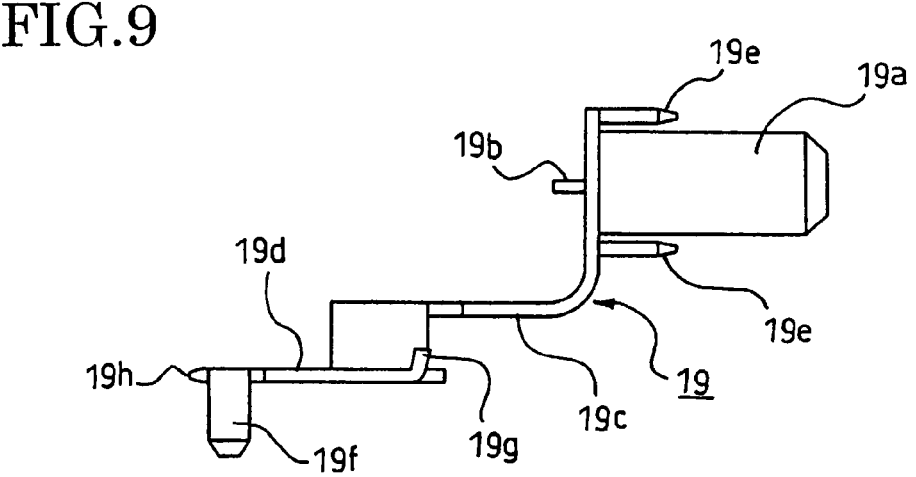
FIG. 9 is a side view illustrating the other of the metal terminal members used in the noise suppression structure of the blower motor according to an embodiment of the invention.
Figure 10:
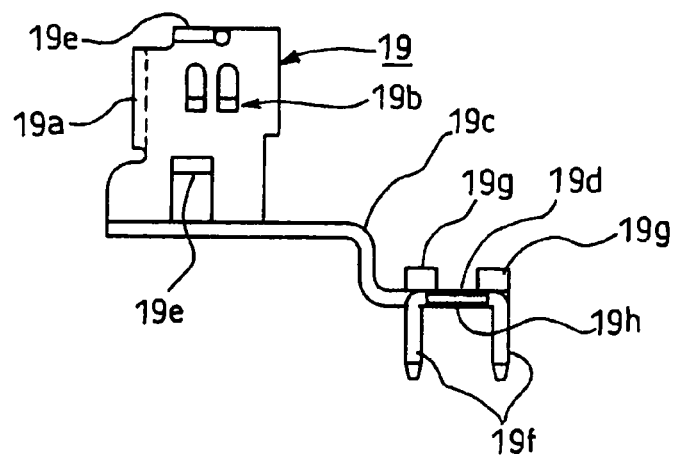
FIG. 10 is a rear view illustrating the other of the metal terminal members used in the noise suppression structure of the blower motor according to an embodiment of the invention.

Referring to FIGS. 6 and 9, in the present preferred embodiment, a lower surface side of the rear end part 19h of the metal terminal member 19 is chamfered such that the metal terminal member 19 smoothly slides and contacts with the inclined guide surface part 25c. In addition, an upper surface side of the rear end part 19h may also be chamfered substantially symmetrically such that the end part of the derivation coil winding 21a is prevented from being damaged by contact.

In addition, a size of the insertion hole 18c of the connector part 18 into which the contact 19a of the metal terminal member 19 is inserted is set to be in a size in which insertion of the contact 19a from an oblique direction is tolerated.

A part of the extension part 19c of the metal terminal member 19 which is nearer to a side of the choke coil 8' than the connection part 19d includes lower surface caulking parts 19f as caulking parts which are fixed to the bottom surface part 17 by being inserted into a pair of slide groove parts 17a penetratedly formed in the bottom surface part 17 of the end bracket member 15 and caulked thereto.

In the present preferred embodiment, parts of the pair of slide groove parts 17a to which the lower surface caulking parts 19f are caulked, respectively, are set to be narrower in width than other parts.

As illustrated in FIG. 2, according to the noise suppression structure of the blower motor according to the present preferred embodiment of the invention, an upper surface of each of the reinforcement rib parts 17c provided on the bottom surface part 17 is formed with a supporting surface part 17d which extends substantially horizontally and contacts with the metal terminal member 19 from below to support the metal terminal member 19.

Now, action of the noise suppression structure of the blower motor according to the present preferred embodiment will be described based on an order of assembling illustrated in FIGS. 11 to 17.

Figure 16:
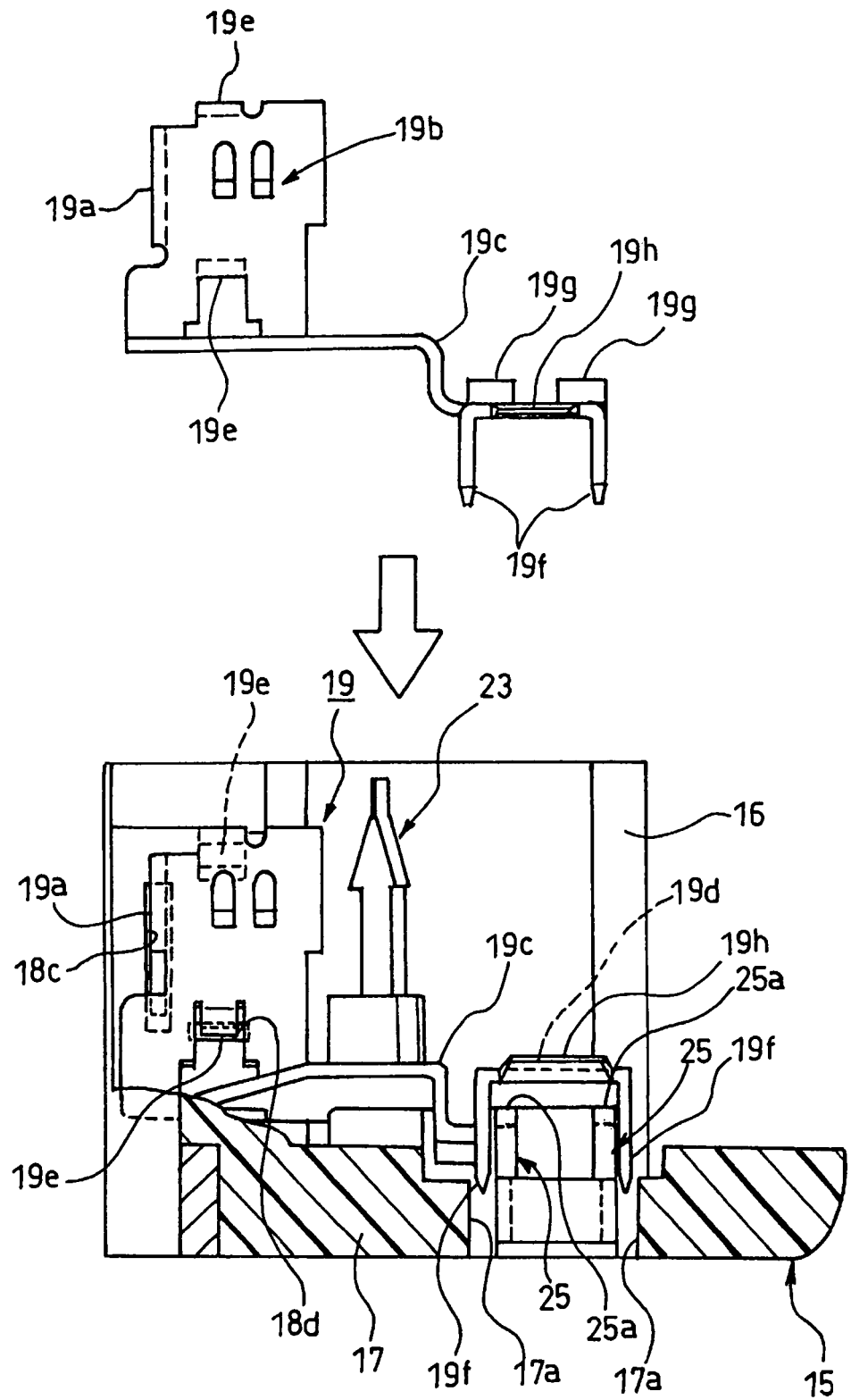
FIG. 16 is an exploded rear view illustrating the process of the slide-insertion of the metal terminal member in the assembling process of the noise suppression structure of the blower motor according to an embodiment of the invention.

Referring to FIGS. 11 and 16, according to the noise suppression structure of the blower motor of the present preferred embodiment, the contacts 19a are obliquely inserted into the insertion holes 18c formed on the partition wall surface part 19b, respectively, when the pair of metal terminal members 19 is to be attached to the connector part 18 of the end bracket member 15.

In the insertion of each of the contacts 19a, a lower surface side of the connection part 19d of the metal terminal member 19 is once placed and temporarily located on the metal terminal guide surface part 25a of the guide member 25.

Figure 12:
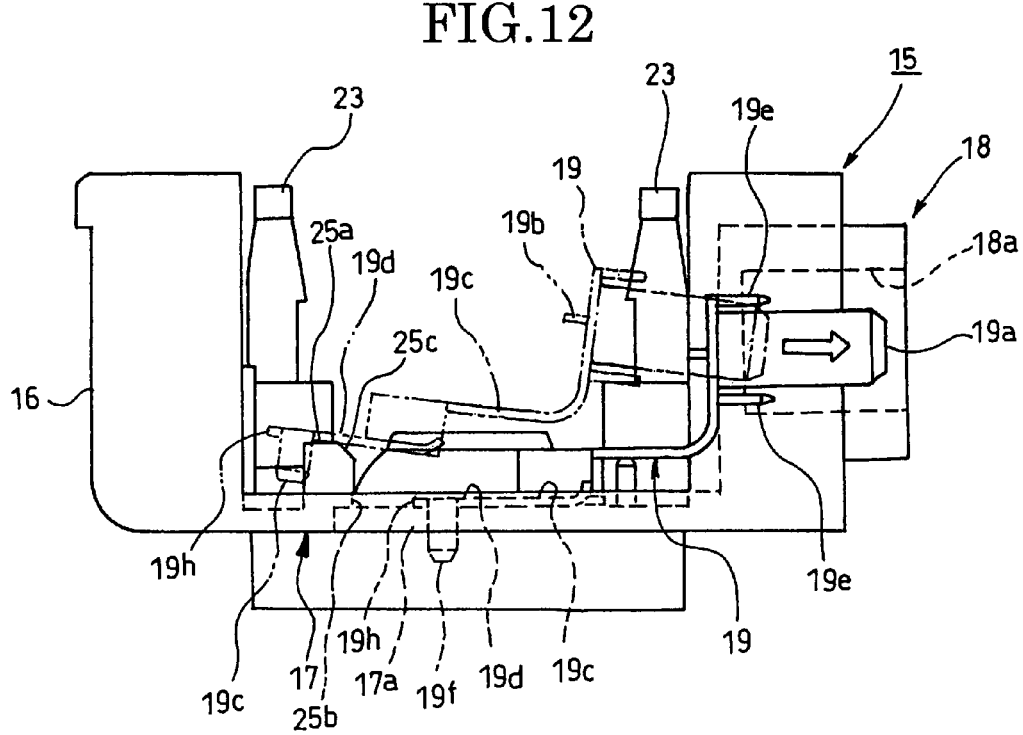
FIG. 12 is an exploded side view illustrating a process of the slide-insertion of the metal terminal member in the assembling process of the noise suppression structure of the blower motor according to an embodiment of the invention.
Figure 17:
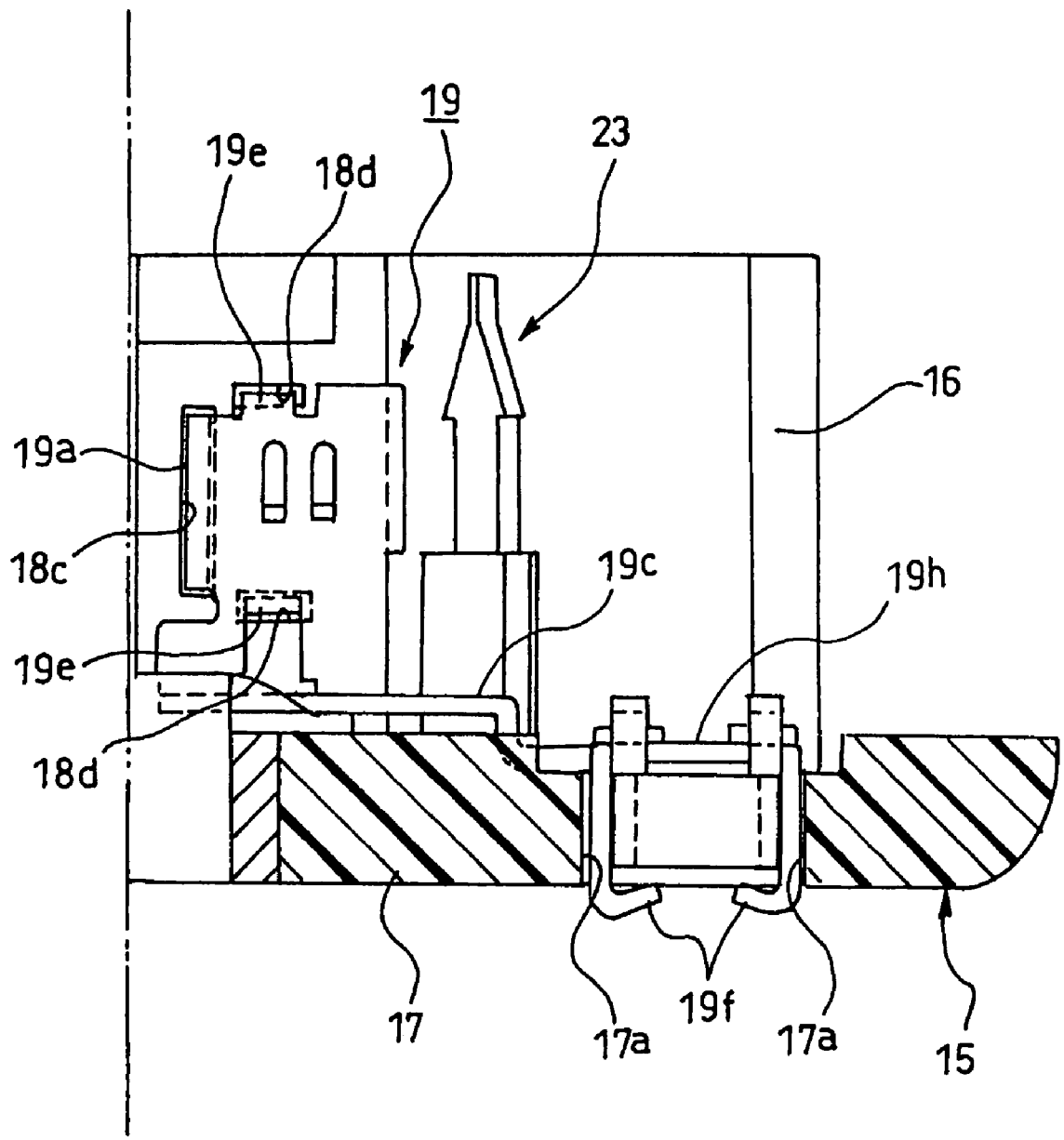
FIG. 17 is an exploded rear view illustrating the fixing process of the metal terminal member in the assembling process of the noise suppression structure of the blower motor according to an embodiment of the invention.

Then, referring to FIGS. 12 and 17, when the contacts 19a are inserted into the insertion holes 18c formed on the partition wall surface part 18b in such a manner that the contacts 19a are inserted substantially in parallel with the bottom surface part 17, the lower surface side of the connection part 19d contacts with and slides to move on the metal terminal guide surface part 25a, and the rear end part 19h falls along the inclined guide surface part 25c.

Here, as illustrated in FIG. 11, since the constant dimension h1 of drop or gap is provided between the metal terminal guide surface part 25a and the side surface on the connecter part side provided with the stopper part 25b of the guide member 25, a feeling of click is generated when the metal terminal member 19 is mounted.

Hence, it is possible to confirm that the metal terminal member 19 is actually fallen and located on a fixing position when the metal terminal member 19 is mounted.

Also, the caulking parts 19e are inserted into the pairs of upper and lower caulking holes 18d in such a manner that the caulking parts 19e are inserted substantially in parallel with the bottom surface part 17. Thus, it is possible to set dimensions of internal diameter of the caulking holes 18d small to reduce dimensional tolerance at the time of mounting.

As illustrated in FIG. 17, the lower surface caulking parts 19f are caulked to a peripheral part, formed narrower in width, of the slide groove parts 17a. The front surface caulking parts 19e are also caulked to the partition wall surface part 19b, as illustrated in FIG. 13.

A pair of leg-like terminals of the noise-killer capacitor member 20 is each caulked to the rear side caulking part 19b to connect both of the metal terminal members 19. The leg-like terminals of the noise-killer capacitor member 20 may be further connected with the rear side caulking parts 19b by solder.

In addition, the derivation coil windings 21a of the choke coils 8' installed on the opposite side of the connector part 18 in the end bracket member 15 are interposed between the not-illustrated metal plates or sheets and the connection parts 19d, respectively, and the electrodes are inserted from the upper and lower directions through welding holes 17b to contact each of the interposed part so as to perform the resistance welding.

Figure 15:
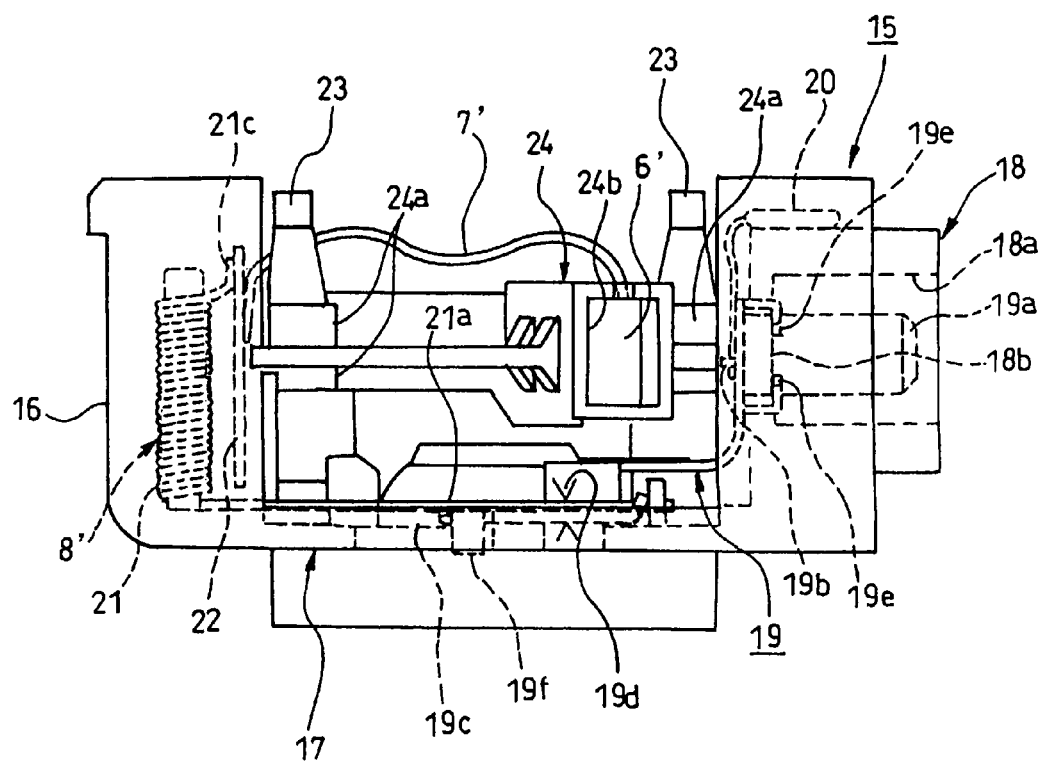
FIG. 15 is an exploded side view illustrating a process of holding brushes in the brush holder member in the assembling process of the noise suppression structure of the blower motor according to an embodiment of the invention.

Moreover, as illustrated in FIG. 14, the brush holder member 24 is mounted on the supporting pin members 23 through the rubber bushes 24a, and the brush members 6' are inserted in the holder part 24b of the brush holder member 24, as illustrated in FIG. 15. The brush members 6' are biased by the not-illustrated biasing members such as the spring members or the like toward inside substantially in the radial direction, such that the brush members 6' are each held slidably.

Referring to FIG. 18, the end bracket member 15 assembled as described above in accordance with the present preferred embodiment is mounted with the motor rotary shaft member 4' rotatably, and the end edge 16b of the end bracket member 15 is fitted to the one end opening 11a on the rear end side of the housing 11 to be mounted, in such a manner that the peripheral wall part 16 is located between the bottom surface part 17 and the housing 11.

Accordingly, since the noise killer capacitor member 20 and the choke coils 8' are accommodated inside of the end bracket member 15, there is no outwardly protruded part. Hence, there is no generation of interference when a bracket member 30 preferably made of a resin and to be attached to a side of a vehicle body is fitted to outside of the housing 11.

Therefore, according to the noise suppression structure of the blower motor according to the present preferred embodiment, the extension part 19c of the metal terminal member 19, extendedly provided from the connector part 18, is provided with the connection part 19d for connecting the derivation coil winding 21a of the choke coil 8'.

Hence, it is possible to provide the connection part 19d of the metal terminal member 19 in the outer circumferential direction S of the bottom surface part 17 and adjacent to the choke coil 8'.

Therefore, it is possible to shorten a distance from the choke coil 8' to the connection part 19d of the metal terminal member 19, and thereby, the number of times of bending is reduced to one bending point 21b. Thus, it is possible to reduce a residual amount of internal stress caused by wiring, and to obtain good workability.

Hence, it is possible to prevent the welding part between the connection part 19d and the derivation coil winding 21a from detachment in the connection part 19d of the metal terminal member 19.

Also, since the extension part 19c extendedly provided in the circumferential direction S along the bottom surface part 17 includes the connection part 19d, connection of the metal terminal member 19 and the derivation coil winding 21a through the welding hole 17b near the bottom surface part 17 is possible.

Therefore, the workability in the connection is good.

Furthermore, even in a case in which the derivation coil winding 21a of the choke coil 8' is structured by directly extending the winding from the coil body 21, it is possible to reduce influence on the connection in the connection part 19d even when the residual stress exists, since the distance from the choke coil 8' to the connection part 19d of the metal terminal member 19 is short and the derivation coil winding 21a of the choke coil 8' after the connection is guided by the guide members 25.

When the metal terminal member 19 is attached to the connector part 18 from inside of the motor, the metal terminal member 19 smoothly slides and guided obliquely by the metal terminal guide surface part 25a provided on the upper surface of the guide member 25.

Accordingly, workability in attachment of the metal terminal member 19 is good. Also, it is possible to accommodate the metal terminal member 19, provided with the extension part 19c and having a constant length, in the relatively narrow end bracket member 15, easily.

Moreover, the rear end part 19h of the metal terminal member 19 contacts with the stopper part 25b provided in the guide member 25, so as to prevent the contact 19a from coming off the connector part 18.

Hence, operation in trial assembling is easy, and it is possible to curb increment in the number of components since there is no necessity of providing a guide member or a stopper member separately.

In addition, the insertion hole 19c formed on the partition wall surface part 18b of the connector part 18 is set to be in the size in which the insertion of the contact 19a of the metal terminal member 19 in the oblique direction is tolerated. Therefore, workability in insertion of the metal terminal member 19 is good.

The metal terminal member 19 is caulked and fixed to the bottom surface part 17 of the end bracket member 15 by the lower surface caulking parts 19f provided in the extension part 19c of the metal terminal member 19.

In the present preferred embodiment, the lower surface caulking parts 19f of the metal terminal member 19 are caulked to the peripheral part of the slide groove parts 17a formed narrow in width. Therefore, not only movement of the metal terminal member 19 in the upper and the lower directions but also the movement thereof in a direction of slide along the bottom surface part 17 is prevented.

Thus, it is possible to stably fix the metal terminal member 19 regardless of a size set for the insertion hole 18c.

The upper surface of the reinforcement rib part 17c provided on the bottom surface part 17 is formed with the supporting surface part 17d which contacts with the metal terminal member 19 from the lower surface side of the metal terminal member 19 and support the metal terminal member 19.

Hence, even in this respect, it is further possible to stably fix the metal terminal member 19 without increasing the number of components.

Also, the mounting of the metal terminal member 19 in accordance with the slide movement thereof is carried out further smoothly by the inclined guide surface part 25c provided between the metal terminal guide surface part 25a and the side surface on the connector part side of the guide member 25.

As illustrated in FIG. 11, since the constant dimension h1 of drop or gap is provided for the inclined guide surface part 25c, it is possible to generate the feeling of click at the time of the attachment of the metal terminal member 19 when the metal terminal member 19 falls on the fixing position and mounted.

Therefore, it is possible to ensure the confirmation that the metal terminal member 19 is positioned in the mounting position. Hence, the workability in assembling is good.

In the above-described preferred embodiment of the invention, the metal terminal member 19 is formed substantially in the S-like configuration as seen from the top, and the part of the extension part 19c of the metal terminal member 19 nearer to the side of the choke coil 8' than the connection part 19d includes the lower surface caulking parts 19f as the caulking parts fixed to the bottom surface part 17 by being inserted into the pair of slide groove parts 17a penetratedly formed in the bottom surface part 17 of the end bracket member 15 and caulked thereto, but it is not limited thereto.

In one embodiment, the lower surface caulking parts 19f are formed near the connection part 19d, or formed nearer to the side of the connector part 18 than the connection part 19d. Any shape such as A straight line shape, an arch-like shape or a combination of shapes can be employed for the shape of the metal terminal member 19 as long as the metal terminal member 19 extends in the circumferential direction along the bottom surface part. In addition, the number of the metal terminal member 19 and a material used therefor are not limited to the above-described embodiments.

The present application is based on and claims priority from Japanese Application Number 2006-015787, filed Jan. 25, 2006, the disclosure of which is hereby incorporated by reference herein in its entirety.

Although the present invention has been described in terms of exemplary embodiments, it is not limited thereto. It should be appreciated that variations may be made in the embodiments described by persons skilled in the art without departing from the scope of the present invention as defined by the following claims. The limitations in the claims are to be interpreted broadly based the language employed in the claims and not limited to examples described in the present specification or during the prosecution of the application, which examples are to be construed as non-exclusive. For example, in the present disclosure, the term "preferably", "preferred" or the like is non-exclusive and means "preferably", but not limited to. Moreover, no element and component in the present disclosure is intended to be dedicated to the public regardless of whether the element or component is explicitly recited in the following claims.

What is claimed is:

1. A noise suppression structure of a blower motor, comprising:
a bottomed, substantially cylindrical-shaped end bracket member including a peripheral wall part and a bottom surface part, the peripheral wall part being provided between the bottom surface part and a housing and an end edge of the peripheral wall part being configured to be mounted to an one end opening of the housing, and the bottom surface part being integrally formed with the peripheral wall part, rotatably supporting one end of a motor rotary shaft part and covering the one end opening of the housing;
a connector part disposed in the end bracket member, provided in the peripheral wall part, and to which electric power is externally supplied;
a metal terminal member provided in the end bracket member, coupled to the connector part, and including an extension part being extendedly provided along the bottom surface part in a circumferential direction of the bottom surface part and having a connection part;
a brush member provided in the end bracket member and opposing a commutator mounted to the motor rotary shaft part; and
a noise reduction member disposed in the end bracket member in a position opposite to a side of the peripheral wall part to which the connector part is provided, and inserted between the metal terminal member and the brush member to be connected with the connection part of the extension part of the metal terminal member and the brush member;
wherein the noise reduction member includes a choke coil;
wherein the noise suppression structure of the blower motor further comprises a guide member having guide side walls extending in a direction from the bottom surface part toward an inside part of the blower motor,
wherein the guide side walls which extend in the direction from the bottom surface part toward the inside part of the blower motor are configured:
to guide a conductor of the choke coil of the noise reduction member along the bottom surface part in the circumferential direction of the bottom surface part, and
to slide and guide the metal terminal member to mount the metal terminal member to the connector part from the inside part of the blower motor.

2. The noise suppression structure of the blower motor according to claim 1, wherein the guide member has a constant height and the guide member includes a metal terminal guide surface part on an upper surface thereof configured to slide and guide the metal terminal member when the metal terminal member is mounted to the connector part from the inside part of the blower motor.

3. The noise suppression structure of the blower motor according to claim 2, wherein the guide member includes a stopper part on a side surface of the guide member facing the connector part, which contacts with a rear end part of the metal terminal member to prevent the metal terminal member from coming off the connector part.

4. The noise suppression structure of the blower motor according to claim 1, wherein the connector part includes an insertion hole to which a part of the metal terminal member is inserted, and a size of the insertion hole is set in a size in which insertion of the metal terminal member in an oblique direction is tolerated.

5. The noise suppression structure of the blower motor according to claim 1, wherein the bottom surface part includes a reinforcement rib part, and an upper surface of the reinforcement rib part is provided with a supporting surface part which contacts with the metal terminal member from below to support the metal terminal member.

6. The noise suppression structure of the blower motor according to claim 2, wherein the guide member protruded from the bottom surface part includes an inclined guide surface part between the metal terminal guide surface part and a side surface of the guide side walls facing the connector part, and the inclined guide surface part is slanted to have a constant dimension of drop.

7. The noise suppression structure of the blower motor according to claim 1, wherein the extension part of the metal terminal member includes a caulking part adapted to be fixed to the bottom surface part of the end bracket member.

8. The noise suppression structure of the blower motor according to claim 7, wherein the bottom surface part of the end bracket member includes a slide groove part which penetrates the bottom surface part and to which the caulking part is inserted to be caulked and fixed.

9. The noise suppression structure of the blower motor according to claim 1, wherein the connector part includes a caulking hole to which a part of the metal terminal member is inserted and caulked.

10. The noise suppression structure of the blower motor according to claim 1, wherein the bottom surface part includes a welding hole to which an electrode is inserted to connect the noise reduction member with the connection part of the extension part of the metal terminal member by resistance welding.

11. The noise suppression structure of the blower motor according to claim 1, wherein the end bracket member includes a supporting pin member protruded from the bottom surface part toward an inside part of the blower motor for supporting a brush holder member, and the brush member is slidably held in the brush holder member.

12. The noise suppression structure of the blower motor according to claim 2, wherein the conductor of the choke coil includes a bending point in which the conductor is bent to extend substantially linearly toward the connection part of the of the extension part of the metal terminal member.

13. The noise suppression structure of the blower motor according to claim 2, wherein a rear end part of the metal terminal member is chamfered such that the metal terminal member smoothly slides and contacts with the metal terminal guide surface part of the guide member.

14. The noise suppression structure of the blower motor according to claim 2, wherein the metal terminal member includes a pair of guide protrusions projecting from the bottom surface part, and
wherein an end part of the conductor of the choke coil on a side of the connecter part extends and is located between the pair of guide protrusions of the metal terminal member and protruded therefrom, and the protruded end part of the conductor is mounted between the guide protrusions.

15. The noise suppression structure of the blower motor according to claim 1, wherein the guide member includes a pair of guide surfaces parts projecting from the bottom surface part, wherein the conductor extends between the pair of guide surface parts such that the guide surface parts are located on opposing sides of the conductor.

16. The noise suppression structure of the blower motor according to claim 1, wherein the metal terminal member includes projections at an end of the metal terminal member distal from the connector part, wherein the projections are located on the metal terminal member such that the projections partially surround the guide side walls when the metal terminal member is initially mounted to the connector part from the inside part of the blower motor.

17. The noise suppression structure of the blower motor according to claim 7, wherein the caulking part is located on the metal terminal member such that the caulking part partially surrounds the guide side walls when the metal terminal member is initially mounted to the connector part from the inside part of the blower motor.

18. The noise suppression structure of the blower motor according to claim 1, wherein the guide side walls which extend in the direction from the bottom surface part toward the inside part of the blower motor are configured:
- to guide the conductor of the choke coil of the noise reduction member along the bottom surface part in the circumferential direction of the bottom surface part, and
- to slide and guide the connection part of the metal terminal member to mount the metal terminal member to the connector part from the inside part of the blower motor.

* * * * *